United States Patent
Systrom et al.

(10) Patent No.: US 10,701,023 B2
(45) Date of Patent: *Jun. 30, 2020

(54) WITHDRAWAL OF A MESSAGE SENT IN A SOCIAL NETWORKING SYSTEM

(71) Applicant: Facebook, Inc., Menlo Park, CA (US)

(72) Inventors: Kevin York Systrom, San Francisco, CA (US); Michel Krieger, San Francisco, CA (US); Peter X. Deng, Los Altos Hills, CA (US); Samantha P. Krug, San Francisco, CA (US); Christopher Cunningham, Sunnyvale, CA (US); Ian Mc Intyre Silber, San Francisco, CA (US); Ryan Jacob Gomba, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,420

(22) Filed: Apr. 27, 2018

(65) Prior Publication Data

US 2018/0248838 A1 Aug. 30, 2018

Related U.S. Application Data

(63) Continuation of application No. 15/462,759, filed on Mar. 17, 2017, now Pat. No. 9,961,041, which is a continuation of application No. 14/577,004, filed on Dec. 19, 2014, now Pat. No. 9,641,477.

(51) Int. Cl.
| | |
|---|---|
| *G06F 15/16* | (2006.01) |
| *H04L 12/58* | (2006.01) |
| *H04W 4/12* | (2009.01) |

(52) U.S. Cl.
CPC .............. *H04L 51/32* (2013.01); *H04L 51/02* (2013.01); *H04L 51/12* (2013.01); *H04L 51/16* (2013.01); *H04L 51/34* (2013.01); *H04W 4/12* (2013.01)

(58) Field of Classification Search
CPC ......... H04L 51/32; H04L 51/34; H04L 51/02; H04L 51/16; H04L 51/12; H04W 4/12
USPC ....................................................... 709/206
See application file for complete search history.

(56) References Cited

U.S. PATENT DOCUMENTS

| | | | |
|---|---|---|---|
| 9,461,955 B1 * | 10/2016 | Sherrets | ................. H04L 51/32 |
| 9,497,158 B2 * | 11/2016 | LeVasseur | ............ H04L 63/126 |
| 9,641,477 B2 | 5/2017 | Systrom et al. | |
| 9,961,041 B2 | 5/2018 | Systrom et al. | |

(Continued)

OTHER PUBLICATIONS

U.S. Appl. No. 14/577,004, dated Sep. 9, 2016, Office Action.

(Continued)

*Primary Examiner* — Frantz B Jean
(74) *Attorney, Agent, or Firm* — Keller Jolley Preece

(57) ABSTRACT

Some embodiments of a method for withdrawal a message include receiving, by a mobile device, an input to send a first message to a first recipient, the first message containing at least one image or video. The mobile device processes the first message for transmittal to the first recipient. In response to detecting a request to withdraw the first message within a timeout period, the mobile device determines that the first message has not been sent from the mobile device and terminates the processing of the first message for sending.

20 Claims, 9 Drawing Sheets

(56) References Cited

U.S. PATENT DOCUMENTS

| | | | | |
|---|---|---|---|---|
| 2008/0201407 A1* | 8/2008 | Fodor | ................... | H04L 51/04 |
| | | | | 709/203 |
| 2009/0100497 A1* | 4/2009 | Goldberg | ............... | H04L 51/04 |
| | | | | 726/1 |
| 2012/0198233 A1* | 8/2012 | George | .................. | H04L 51/34 |
| | | | | 713/168 |
| 2015/0195232 A1* | 7/2015 | Haugen | .................. | H04L 51/18 |
| | | | | 709/206 |
| 2016/0156782 A1* | 6/2016 | Mumick | ............... | H04W 4/14 |
| | | | | 455/413 |

OTHER PUBLICATIONS

U.S. Appl. No. 14/577,004, dated Dec. 21, 2016, Notice of Allowance.
U.S. Appl. No. 15/462,759, dated Jul. 28, 2017, Office Action.
U.S. Appl. No. 15/462,759, dated Dec. 28, 2017, Notice of Allowance.

\* cited by examiner

WITHDRAWAL OF A MESSAGE SENT IN A SOCIAL NETWORKING SYSTEM

CROSS-REFERENCE TO RELATED APPLICATIONS

This application is a continuation of U.S. application Ser. No. 15/462,759, filed Mar. 17, 2017, now issued as U.S. Pat. No. 9,961,041, which is a continuation of U.S. application Ser. No. 14/577,004, filed Dec. 19, 2014, now issued as U.S. Pat. No. 9,641,477. Each of the aforementioned patents and applications are hereby incorporated by reference in their entirety.

FIELD

Embodiments of the invention are related to the field of electronic communications. More specifically, the embodiments are related to withdrawing messages sent in a social networking system.

BACKGROUND

A social networking system allows its user to connect to and communicate with other social network users. The communications may be through users sending each other messages, which may include one or more audios, videos, and/or images. The messaging often does not incur per message charge; it is less disruptive than real-time communications (e.g., telephone calls); and it can contain more information (e.g., video or images) than other means of communications. Thus, messaging has become imminently popular among social network users.

With the popularity of messaging comes risks to the users. The ease of sending messages, especially those including video or an image, lends to the possibility of a user sending a spontaneous message the user regrets sharing.

SUMMARY OF THE DESCRIPTION

Exemplary methods, apparatuses, and systems withdraw a message upon detecting a request from the user to withdraw the message within a timeout period. In one embodiment, a sending device receives an input to send a message to a recipient. The sending device processes the message for sending to the recipient. If, within the timeout period and/or the message has not been sent, the sending device detects a user request to withdraw the message, the sending device terminates the processing and sending of the message.

When the request is detected after the message has been sent, a request to withdraw the message is sent to a message server of a social networking system. Upon receiving the request to withdraw the message, the message server determines whether or not the message has been sent from the message server. If the message has not been sent from the message server, the message server terminates the processing of the message for sending. In one embodiment, the message server also puts the message on a blacklist to ensure the recipient can no longer retrieve the message. If the message was sent to the recipient, the message server transmits a withdrawal request to the recipient device (e.g., a user device) so that the recipient device may withdraw or otherwise prevent the message from being viewed by the recipient.

The request from the user to withdraw the message may be provided by the user in a variety of ways, such as rapidly shaking the user device, touching/tapping a representation of the recipient on a display of the user device, touching or tapping an animation on the display of the user device that represents the processing the message, etc. In one embodiment, the message withdrawal timeout period is adjusted based on one or more of a variety of factors: the social affinity between the user and the recipient, the number of users included as recipients of the message, and/or the frequency of communications between the user and the recipient(s). Additionally, the processing of the message in the sending device may include waiting for the expiration of the timeout period prior to sending to the message. In one embodiment, if another message to be sent is received from the user during the timeout period, the pending message awaiting the expiration of the timeout period is sent prior to the expiration of the timeout period and the new message causes the reset of the timeout period.

Other features and advantages will be apparent from the accompanying drawings and from the detailed description.

BRIEF DESCRIPTION OF THE DRAWINGS

The present invention is illustrated by way of example, and not by way of limitation, in the figures of the accompanying drawings in which like references indicate similar elements.

DETAILED DESCRIPTION

Figure 1:
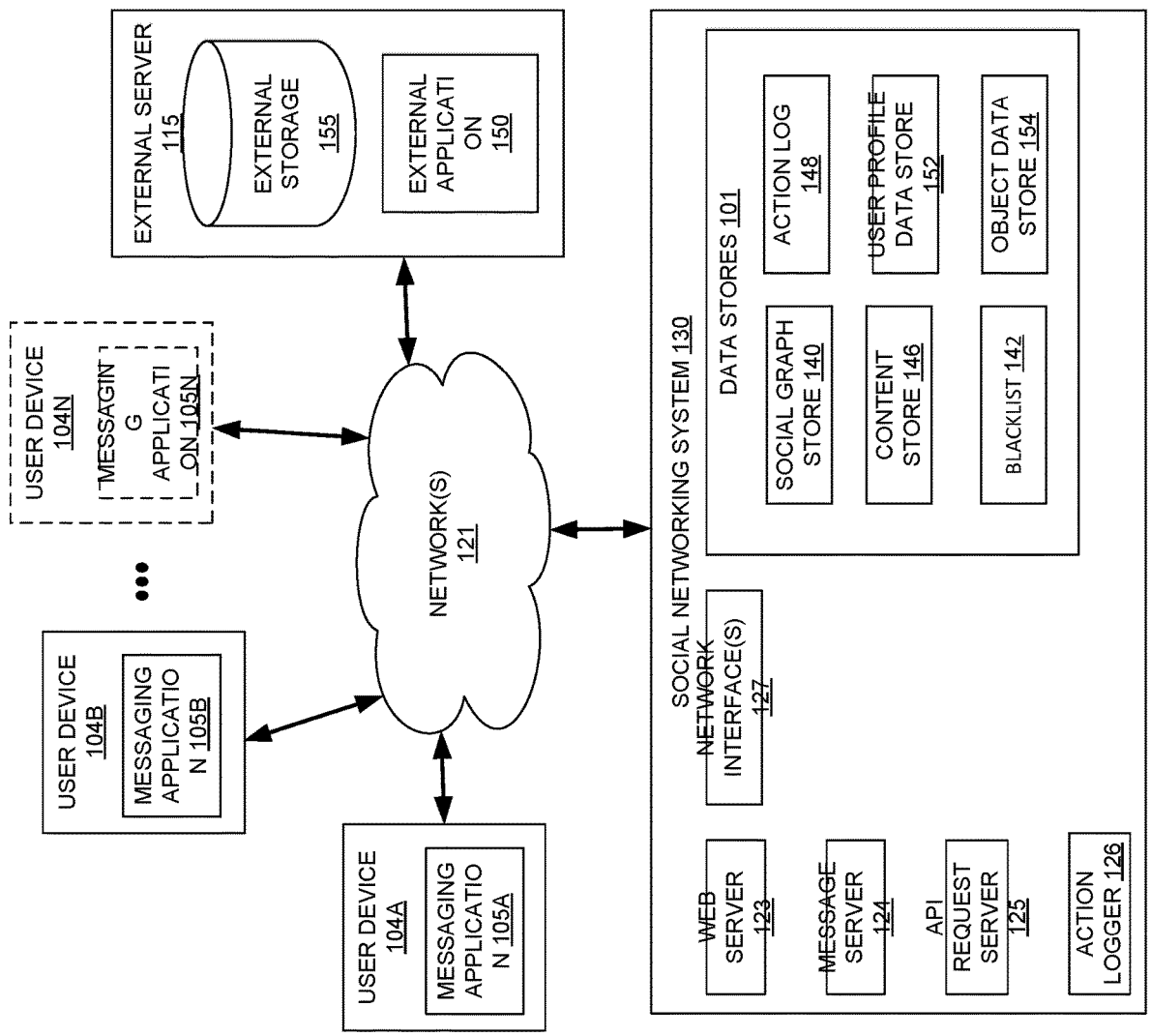
FIG. 1 is a block diagram illustrating a social networking system that offers users the ability to withdraw a message according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware. A user device and a social networking system may comprise one or more electronic devices. Additionally, while a social networking system is used to describe embodiments of withdrawing messages, it will be understood that these concepts are generally applicable to other messaging services, network services/entities, websites, etc.

Messaging through social networking systems, particularly when utilized in a mobile device (e.g., cellphone, tablet, wearable device), encourages sharing impromptu text, images, and/or video. For example, a messaging service may utilize a single input to both capture an image of a user via a front-facing camera on the user device and send the image to one or more recipients. While expediting the process of sharing a moment in time, this type of messaging may cause the user to inadvertently send an image or other message the user ultimately would prefer not to share. Thus, it is advantageous for a social networking system (or other messaging system) to provide users the ability to withdraw a message.

FIG. 1 is a block diagram illustrating a network environment of a system 100 that offers users the ability to withdraw a message according to one embodiment of the invention. The illustrated social networking system 130 includes message server 124 that may withdraw sharing of messages between users of the social networking system.

In some embodiments, the social networking system 130 comprises one or more computing devices storing user profiles associated with users and/or other objects, as well as connections between these users and/or objects. The users and/or other objects are associated with user devices 104A-104N, which are enabled to interact with social networking system 130 and can be any type of computing device capable of receiving user input as well as transmitting and/or receiving data via a network (e.g., network 121). For example, the user devices 104A-104N can include conventional computer systems, such as a desktop or laptop computer, or may include devices having computer functionalities such as Personal Digital Assistants (PDA), cellular or mobile telephones, smart-phones, tablet/phablet, in- or out-of-car navigation systems, gaming devices, wearable electronic device, or other electronic devices. Some user devices are small/light and they can be carried by the user easily, and they are referred to as mobile devices.

In one embodiment, a user device (e.g. 104A) may execute a messaging application (e.g. 105A) allowing a user of the user device 104A to interact with the social networking system 130. For example, the user application 105A may be an application based on a web browser (e.g., Microsoft Windows Internet Explorer, Mozilla Firefox, Apple Safari, Google Chrome, Opera, etc.). In an embodiment, the user application 105A is a special-purpose client application ("App" such as Facebook for iPhone or iPad, etc.), and in an embodiment the user application 105A is the native operating system of the user device 104A, such as Windows®, Mac OSX®, IOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 121 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

The social networking system 130 fundamentally relies upon information representing its users and a set of objects. Users, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the social networking system 130 also allows users to interact with external (e.g., third-party) applications 150 (e.g., websites), external storage 155, and/or external servers 115 (e.g., server end stations).

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions.

Embodiments use the social graph to determine affinity or other characterization of a relationship between users. This characterization of the relationship between two users may be used to determine an amount of time to allow for the potential withdrawal of a message between the users, as described with reference to To provide these functionalities, the embodiment of the social networking system 130 includes an API request server 125, a web server 123, the message server 124, an action logger 126, and a set of data stores 101. This embodiment also includes, within the data stores 101, a social graph store 140 including a blacklist 142 (discussed in more detail with reference to FIG. 7), as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users, through user devices 104A-N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes the message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a post. In some embodiments, a user can send a private message to another user that can only be retrieved by the other user.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

When a user requests a user device (e.g., user device 104A) to send a message to a recipient, (e.g., the user of user device 104B), the message is delivered via social networking system 130. The social networking system 130 receives the message from the sender and delivers the message to the recipient. According to embodiments set forth herein, the message may be withdrawn by one or more different entities. If the message has not been sent from the user device, the messaging application within the user device (e.g., messaging application 105A) may terminate processing of the message for sending to the recipient. If the message has been sent from the user device to social networking system 130, message server 124 of social networking system 130 may withdraw the message from being transmitted to the recipient. If the message has been sent from message server 124, the message server may request the withdrawal of the message from the recipient device (e.g., user device 104B and messaging application 105B). The different withdrawals of messages are discussed in further detail herein.

Embodiments of Message Withdrawal within the Sending Device

Figure 2:
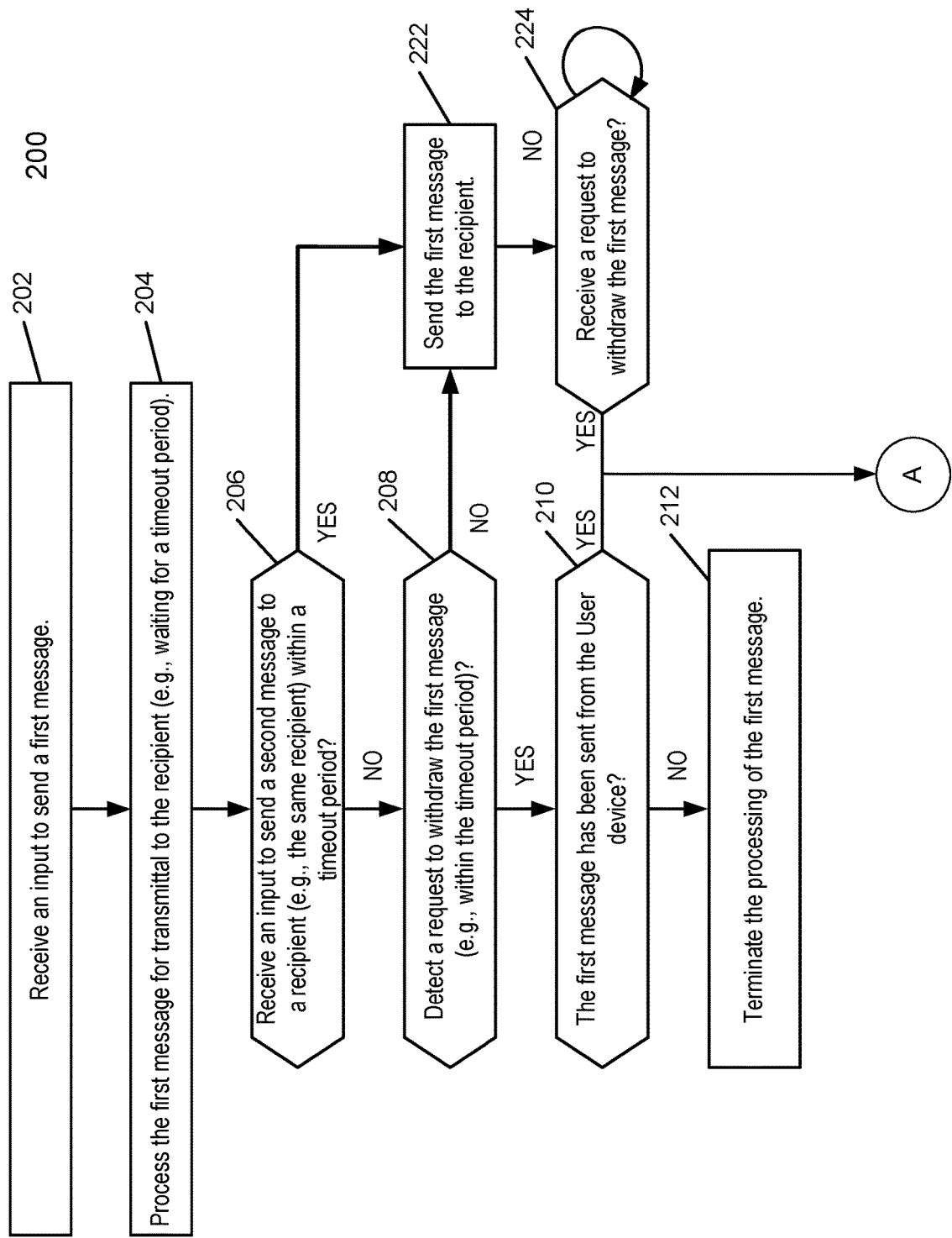
FIG. 2 is a flow diagram illustrating withdrawal of a message at a user device according to one embodiment of the invention.

FIG. 2 is a flow diagram illustrating withdrawal of a message at a user device according to one embodiment of the invention. For example, the user device may be user device 104A of FIG. 1. In one embodiment, the message includes at least one image or video. Additionally, the message may include audio, text, and/or animations.

Although embodiments are described herein as being applied to the message containing at least one image or video, the embodiments can be applied to any types of messages, including ones without an image or video. In one embodiment, the message includes one or more of: an identification of a user account associated with the sending device, an identification of the sending device, an identification of a user account associated with the recipient device, a transaction/message identifier, etc.

At reference 202, a user device receives an input to send a first message to a recipient. In one embodiment, the user is a user of a social networking system (e.g., social networking system 130). Alternatively, the user is a user of another messaging platform. In one embodiment, the recipient may be an individual user, a group of users, or a posting page for others to view and comment.

At reference 204, the user device processes the first message for transmittal to the recipient. For example, the processing may be performed by messaging application 105 of user device 104, as discussed above. In one embodiment, the processing includes waiting for a timeout period (e.g., 5 seconds) to expire before sending the first message to the recipient. For example, the timeout period may be measured from the receipt of the input to send the first message. In one embodiment, the user device uses a fixed timeout period. In another embodiment, the user device uses a dynamic range of timeout periods. This timeout period may be referred to herein as the client timeout period to differentiate this timeout period from a second timeout period implemented by the message server, the server timeout period. The server time period is described with reference to FIG. 7. The range of the timeout periods will be discussed in more detail below with reference to FIG. 7.

In one embodiment, the user device stores the message in a queue during the processing. The queuing (also referred to as buffering) of messages may be implemented in various ways. In one embodiment, each recipient has a corresponding queue that the stores only messages for the specific recipient. In an alternative embodiment, multiple/all recipients share a single queue. In one embodiment, the one or more queues each are able to hold a single message. Alternatively, the one or more queues are each able to hold multiple messages.

At reference 206, the user device determines whether or not the user device has received an input to send a second message within the client timeout period. In one embodiment, the determination is made per recipient, i.e., the second message is to be sent to the same recipient as the first message and the first message is currently stored in a queue corresponding to that recipient. Alternatively, the second message may be addressed to any recipient, e.g., all recipients share a single queue.

If the second message is received, at reference 222, the processing of the second message causes the user device to send the first message, even if the client timeout period for the first message has not expired. For example, the user device may determine that the corresponding queue contains a threshold number of messages. By sending the first message, the user device makes space within the queue for the second message. The receipt of the second message also resets the client timeout period. As such, the user device waits until the new client timeout period expires (or an input to send a third message) before sending the second message. As used herein, the sending of a message by a user device or social networking system includes initiating a transmission of the message. For example, the sending or initiating the transmission of the first message may include processing the message for transmission, waiting for a timeout period to expire, etc. The transmission of the message to the recipient involves transmitting the message via a network to the social networking system. The social networking system (e.g., the message server) in turn initiates the transmission to the receiving user device.

If the second message is not received, at reference 208, the user device determines whether or not the user device has detected an input to withdraw the first message (or otherwise to not share the first message with the recipient). In one embodiment, the user device determines if a request to withdraw the first message is received within the client timeout period. If there is no such request, the user device sends the first message to the recipient (e.g., via a message server) at reference 222. After the first message has been sent to the recipient, the user device determines if a request to withdraw the first message is received at reference 224. If a request to withdraw the first message is received, method 200 optionally proceeds via off page connector A, which starts another process for withdrawing the first message as discussed herein below. If the request is not received, the user device may keep monitoring the request to withdraw at reference 224 (e.g., for a limited time, until another message is received, etc.).

If the user device receives an input to withdraw the first message, at reference 210, the user device determines whether or not the first message has been sent. If the first message has already been sent, method 200 optionally proceeds via off page connector A.

If the first message has not been sent from the user device, the user device terminates the processing of the first message at reference 212.

Not all of the described features of method 200 are necessary for implementing embodiments of the invention. For example, an embodiment may not make the determination of reference 206, resulting in the user device processing the first message regardless of a second message.

Embodiments of Inputs to Withdraw a Message

An input requesting the withdrawal of a message may be implemented using one or more of a variety of sensors. For example, the user device may include a display screen capable of touch input (often referred to as a touch screen). Additionally, the device may include a motion sensor (e.g., an accelerometer or a gyroscope), a sound sensor (e.g., a microphone), a galvanic skin response sensor, etc.

In one embodiment, the user device detects the motion of the user device through the motion sensor. If the user device experiences a rapid shaking within the client timeout period, the user device determines that the motion is to be treated as a request to withdraw the message.

Figure 3B:
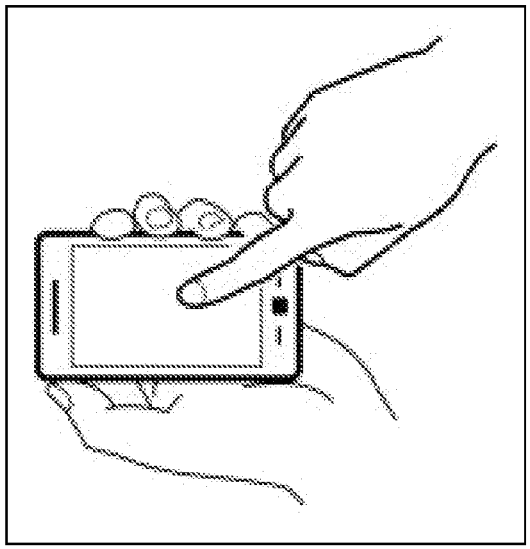
FIG. 3B illustrates touching or tapping of the mobile device as an input to withdraw a message according to one embodiment of the invention.
Figure 3C:
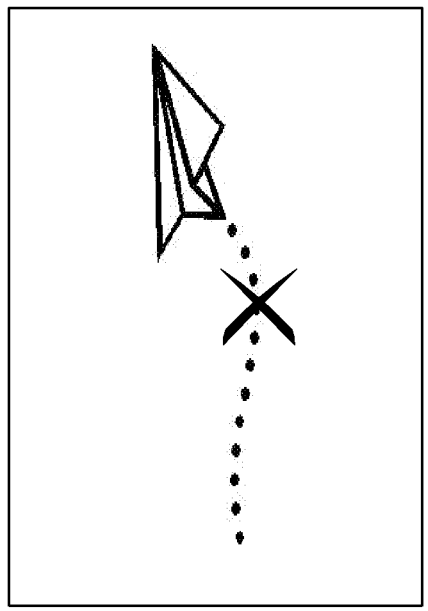
FIG. 3C illustrates an animation of the mobile device with which a user may interact to withdraw a message according to one embodiment of the invention.
Figure 3A:
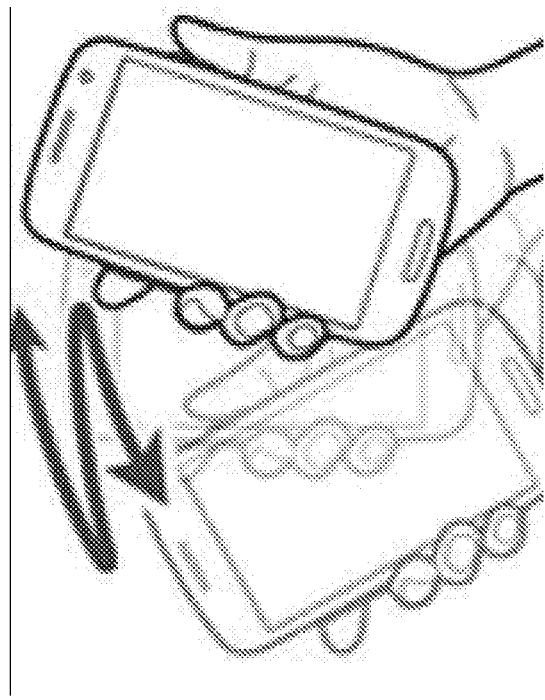
FIG. 3A illustrates shaking of the mobile device as an input to withdraw a message according to one embodiment of the invention.

FIG. 3A illustrates shaking of the user device as an input to withdraw a message according to one embodiment of the invention. The shaking by the user as illustrated is a single-handed, left-right shaking. A different kind of shaking may be defined for the request to withdraw a message. The motion sensor such as the accelerometer detects the change of motion (e.g. acceleration) along with one or more axes and determines whether a threshold amount of movement/shaking has occurred. The user device may adjust the threshold duration, acceleration, and/or the range of shaking depending on the user or the characteristics of the user device (e.g., a user device with a sensitive motion sensor may require much less shaking to detect the request than another device with a less sensitive one).

FIG. 3B illustrates touching or tapping of the user device as an input to withdraw a message according to one embodiment of the invention. In one embodiment, when the user device receives input to send a message to a recipient, a representation of the recipient (an image and/or a name of the recipient) is displayed on the touch screen. The user device may display countdown timer or other representation of message processing (e.g., in place of the representation of the recipient) during the processing of the message. For example, the countdown timer displays the initial client timeout period value and counts down to expiration of the client timeout period. The countdown timer is a visible indication to the user as of how much time left for the user to withdraw the message before the user device sends the message. The expiration of the timer (e.g., visually displayed as the timer disappearing) indicates that the message has been sent. The user may touch or tap the touch screen on the countdown timer or other representation to request withdrawal of the message.

FIG. 3C illustrates a message processing/sending animation displayed by the user device according to one embodiment of the invention. In one embodiment, when processing the message for sending, the user device displays an animation on the touch screen. For example, the user device may display a paper airplane flying across the screen as illustrated (or an envelope, a postcard, etc.). In one embodiment, the animation moves on the touch screen as the message is being processed for sending. For example, the illustrated example shows a trail of the airplane that extends during the duration of the message processing/client timeout period. The user may touch or tap the send animation and the user device interprets the touching or tapping as the request to withdraw the message and terminate the processing the message. For example, the user device may detect a touch input on the airplane or the trail of the airplane as a request to withdraw the currently pending message. In one embodiment, the user device changes the appearance of the animation in response to the input. As illustrated, the touching or tapping causes the user device to add a cross to the trail of the airplane, indicating the processing is being terminated. Additionally, the user device may change the animation to show the airplane crash, turn into a crumpled piece of paper, land in a trash bin, etc. to illustrate the withdrawal of the message. In one embodiment, when the processing cannot be successfully terminated, the user device changes the animation to show a message or another indication of the failure to withdraw the message.

A variety of other inputs may trigger the withdrawal of the message. For example, the mobile device, using the sound sensor, may interpret speech input to be a request to withdraw a message. In one embodiment, one or more of the inputs for triggering the withdrawal (referred to as undo inputs) of the message is interpreted by user device as a user command to withdraw the message when the undo input is received immediately following input to initiate the transmission of the message or during a client timeout period after the user device receives the input to initiate transmission of the message.

Embodiments of Withdrawal of a Message at the Message Server

Figure 4:
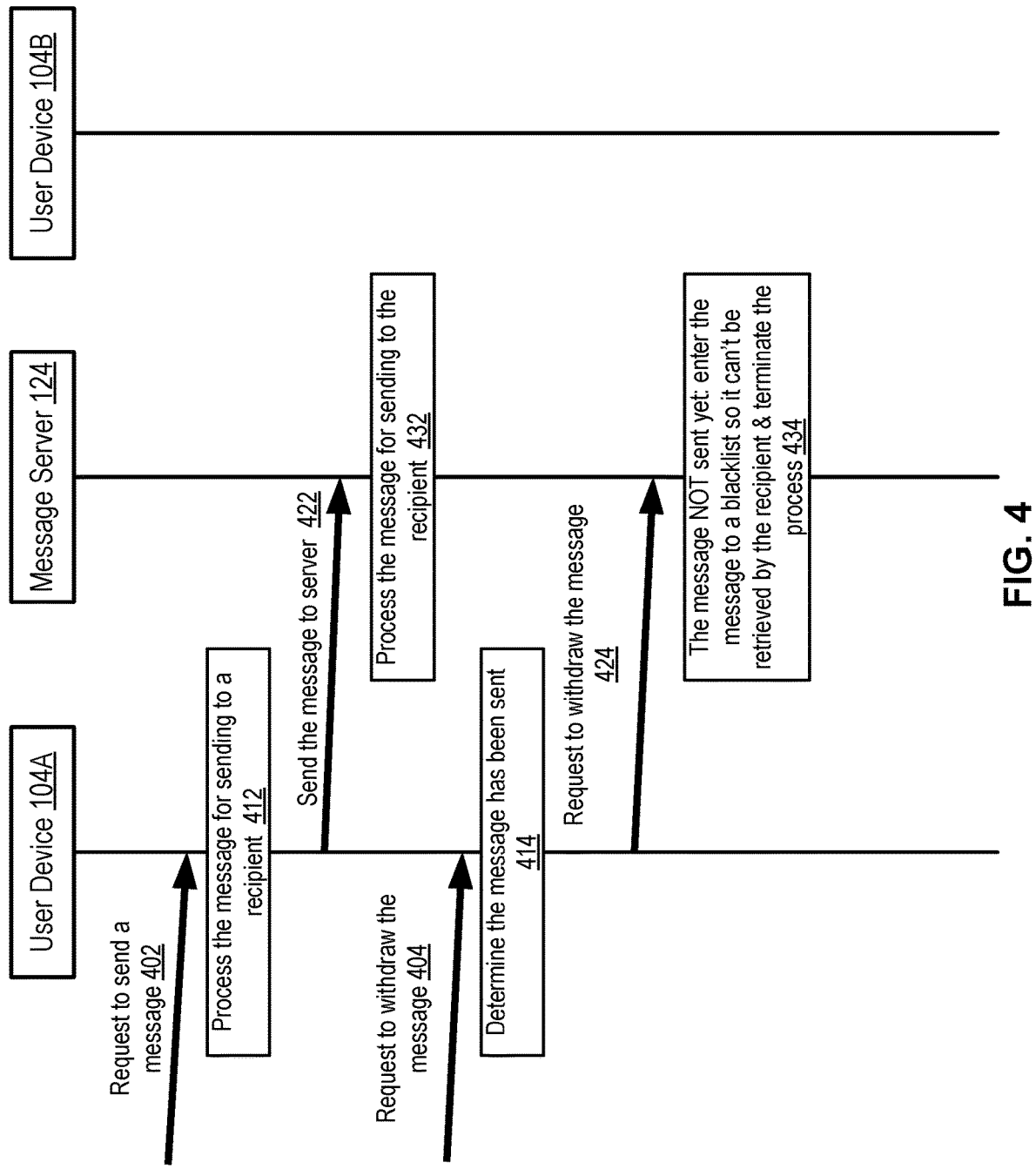
FIG. 4 illustrates a message server processing a message withdrawal request according to a first embodiment of the invention.

FIG. 4 illustrates message server 124 processing a message withdrawal request according to a first embodiment of the invention. At reference 402, user device 104A receives input to send a message to user device 104B (via message server 124). User device 104A processes the message for sending to the recipient at reference 412. As described above, the processing may include waiting for the expiration of a client timeout period before sending the message. Upon completion of the processing, at reference 422, user device 104A sends the message to message server 124. At reference 432, the message server 124 processes the message for sending to user device 104B.

At reference 404, user device 104A receives a request to withdraw the message. At reference 414, user device 104A determines that the message was sent to message server 124. In response, user device 104 sends a request to withdraw the message to message server 124 at reference 424. The request contains a message identifier to enable message server 124 to determine which message to withdraw. The identifier of the message may be a transaction identifier or other unique identifier of the message.

At reference 434, message server 124 determines the message has not been sent yet. In one embodiment, message server 124 enters a representation of the message (e.g., the message identifier) into a blacklist in response to receiving the withdrawal request and determining the message has not been sent yet, and terminate processing of the message. For example, message server 124 maps the received identifier to a message being processed for transmission to user device 104B. The blacklist is a data structure indicating messages are inaccessible to one or more recipients. When a recipient attempts to retrieve a message from message server 124, message server 124 checks the blacklist and, if the message is on the blacklist, the request for retrieval is rejected. In one embodiment, message server 124 terminates the processing of the message or otherwise cancels the transmission of the message to user device 104B in response to receiving the withdrawal request and determining the message has not been sent yet.

Figure 5:
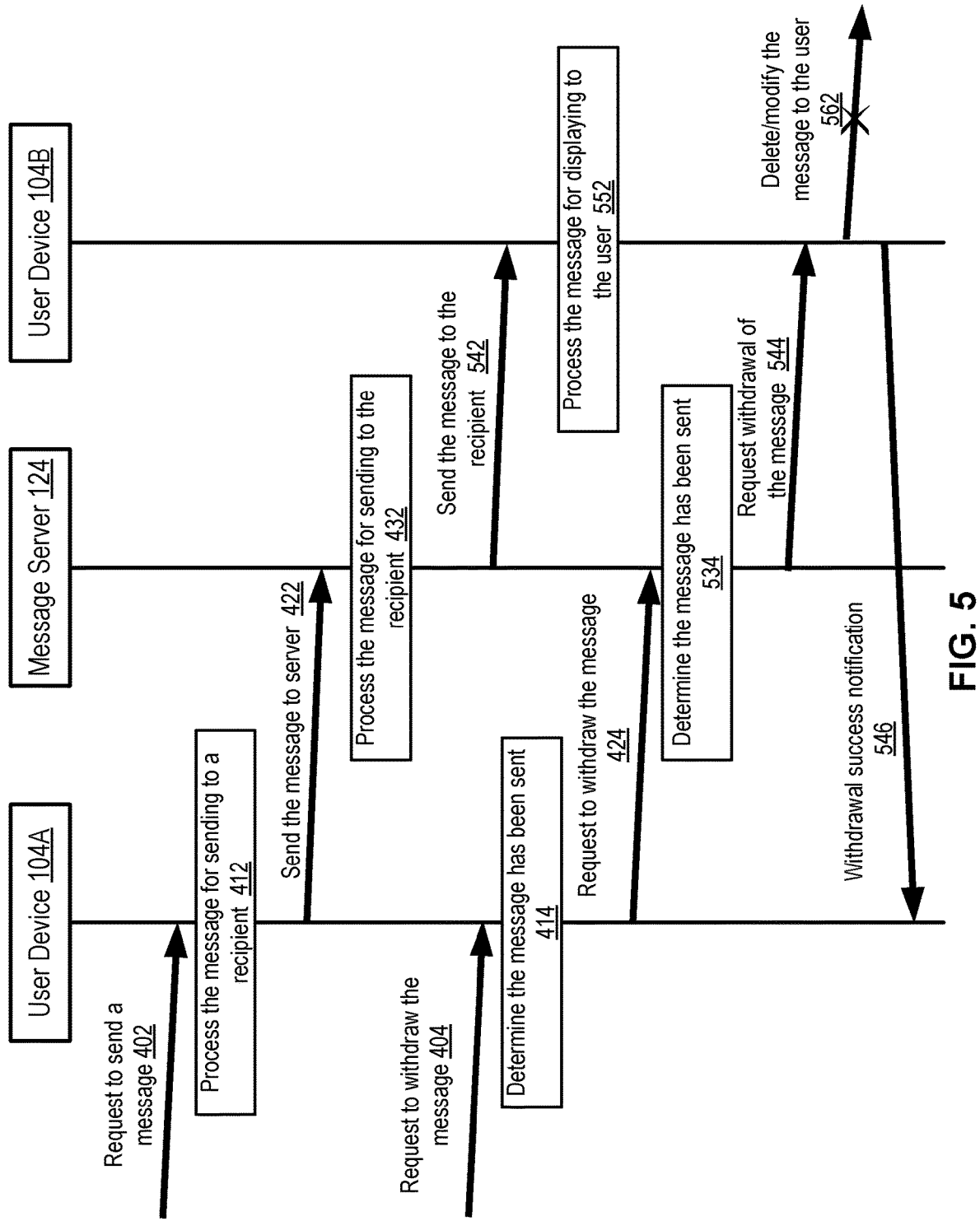
FIG. 5 illustrates the message server processing a message withdrawal request according to a second embodiment of the invention.

FIG. 5 illustrates message server 124 processing a message withdrawal request according to a second embodiment of the invention. FIG. 5 is similar to FIG. 4 and the same reference numbers indicate elements or components having the same or similar functionalities. One difference is that message server 124 receives the request to withdraw the message (reference 424) after message server 124 has sent the message to user device 104B at reference 542. In one embodiment, user device 104B processes the message for displaying to the user at reference 552 in response to receiving the message from message server 124. Alternatively, user device 104B does not process the message until user device 104B receives an input from a user requesting the display of the message.

At reference 534, upon receiving the request to withdraw the message from user device 104A at reference 424, message server 124 determines that the message has been sent to user device 104B at reference 534. Similar to the description above, message server 124 maps a transaction identifier or other unique message identifier received in the withdrawal request to messages that have been transmitted to determine that the message was sent to user device 104B.

In response to determining the message has been sent to user device 104B, message server 124 sends a request to withdraw the message to user device 104B at reference 544. In response to the withdrawal request, user device 104B causes the message to not be displayed/further displayed (e.g., deleting or modifying the message) to a user at reference 562. In one embodiment, user device 104B deletes the message in response to the request to withdraw the message. In another embodiment, user device 104B modifies the message to replace the content with another content. For example, if the message included a photo or video, user device 104B modifies the message to replace the photo or video with a default image or video as a representation of the withdrawal of the message. Alternatively, the photo or video may be blurred, redacted, or otherwise obscured.

In one embodiment, user device 105A sends confirmation of the successful withdrawal of the message to user device 105A via message server 124 at reference 546. In one embodiment, the recipient is also notified that the message for him/her/a group has been withdrawn.

Figure 6:
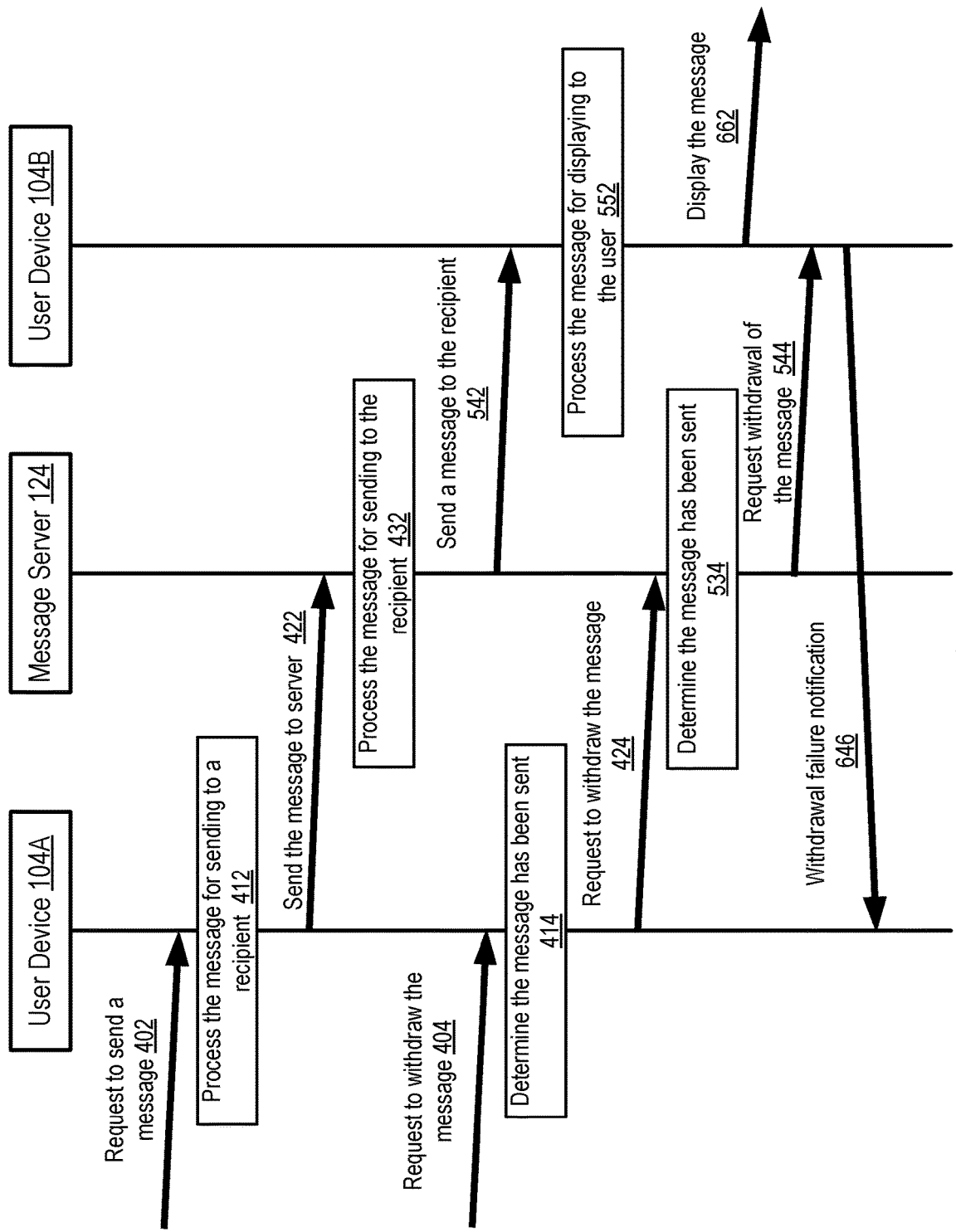
FIG. 6 illustrates the message server processing a message withdrawal request according to a third embodiment of the invention.

FIG. 6 illustrates message server 124 processing a message withdrawal request according to a third embodiment of the invention. FIG. 6 is similar to FIG. 5 and the same reference numbers indicate elements or components having the same or similar functionalities. One difference is that user device 104B receives the message withdrawal request from message server 124 (reference 544) after user device 104B has displayed the message at reference 662. In one embodiment, user device 104B sends a withdrawal failure notification to user device 104A via message server 124 at reference 646. In another embodiment, user device 104B deletes or otherwise alters the message as described above and notifies user device 104A via message server 124 that the message was withdrawn after being displayed.

Figure 7:
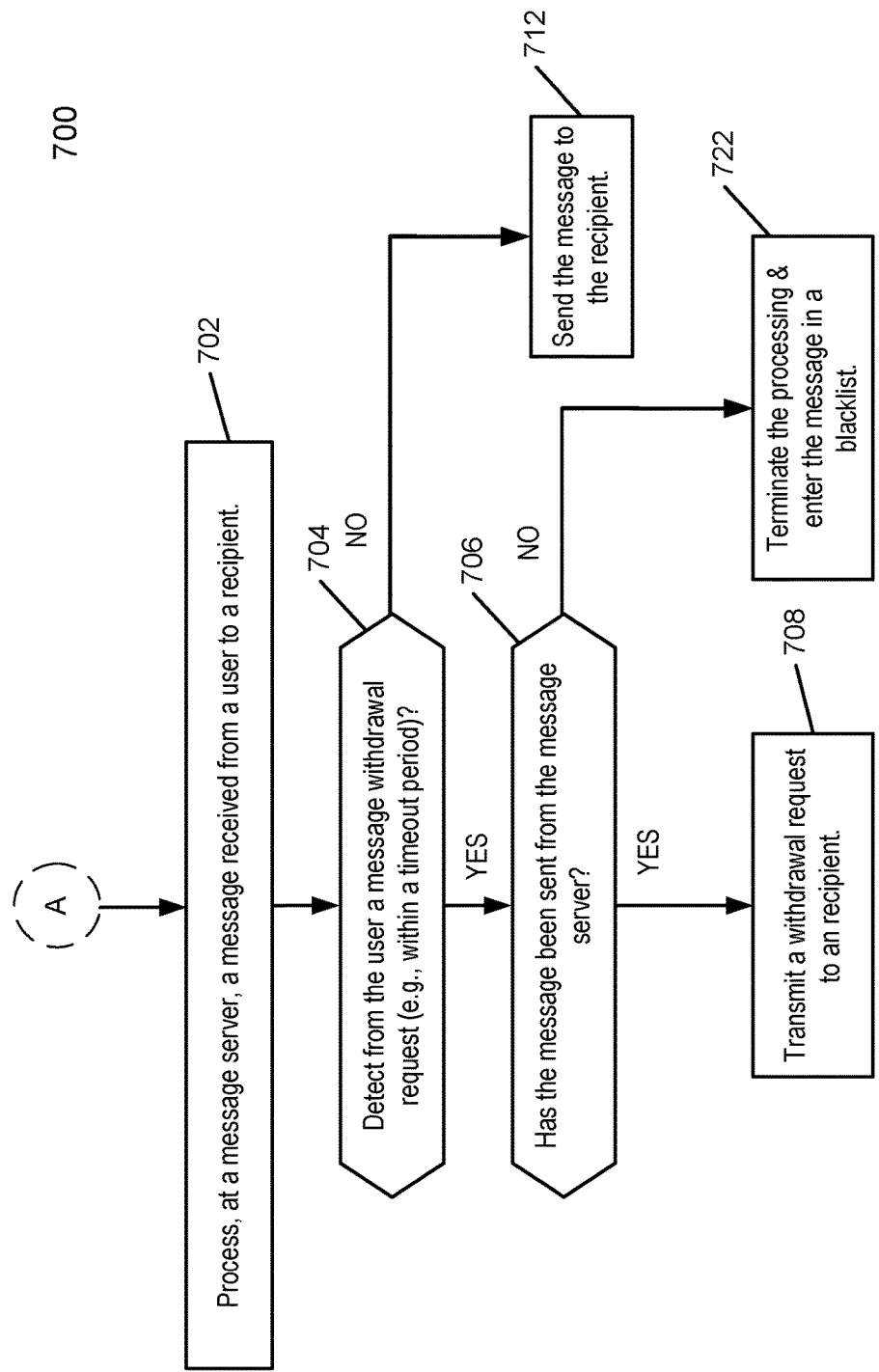
FIG. 7 is a flow diagram illustrating the message server processing a message withdrawal request according to one embodiment of the invention.

FIG. 7 is a flow diagram illustrating method 700 of the message server (e.g., message server 124) processing a message withdrawal request according to one embodiment of the invention. In one embodiment, method 700 is a continuation of method 200 (continuing from off page connector A of FIG. 2).

At reference 702, the message server receives a message addressed to a recipient from a user device. The message server processes the received message for delivery to the recipient. For example, the message server maps the recipient address in the received message to a user account and/or recipient device. In one embodiment, the processing includes a server timeout period before the message is transmitted to the recipient device.

At reference 704, the message server determines whether or not the message server has received a message withdrawal request. In one embodiment, the message server makes this determination during or at the expiration of the server timeout period. For example, prior to sending the message, the message server determines whether or not the message is on a blacklist. In another embodiment, the message server makes this determination as a part of receiving a message withdrawal request. As discussed herein, the message withdrawal request includes a message identifier to enable the message server to identify the corresponding message to be withdrawn. If the message server has not received a message withdrawal request, the message server sends the message to the recipient at reference 712.

If the message server has received a message withdrawal request, at reference 706, of the message server determines whether or not the message server has sent the message to the recipient device. If the message has not been sent, at reference 722, the messaging server terminates the processing of the message and enters the message in a blacklist. As a result, the recipient device does not receive and is prohibited from retrieving the message.

If the message was sent from the message server, at reference 708, the message server transmits a withdrawal request to the recipient device (e.g., as described with reference to FIGS. 5-6 above).

Note methods 200 and 700 each include a timeout period (referred to, respectively, as the client timeout period and the server timeout period) for detecting a request not to share a message. The timeout period can be in the range of 1 second to 30 minutes. The two timeout periods may or may not be the same. Also, the timeout period may be adjusted by the sending user device or the message server depending on various factors. For example, if the recipient is a group of users, the timeout period(s) may be longer to give the user more time to withdraw the sharing. In one embodiment, the larger the group, the longer the timeout periods. In one embodiment, if the recipient is someone with which the sending user communicates frequently, the timeout periods may be shorter. Additionally, the timeout period may be adjusted based upon the social affinity between the sending user and the recipient. For example, if the user and the recipient are directly connected within a social networking system or otherwise are connected as friends, the timeout period may be set shorter than when the user and the recipient are indirectly connected or determined to be coworkers. The determination of the social affinity may be based on the social graph discussed herein.

Creation of Social Graph

Figure 8:
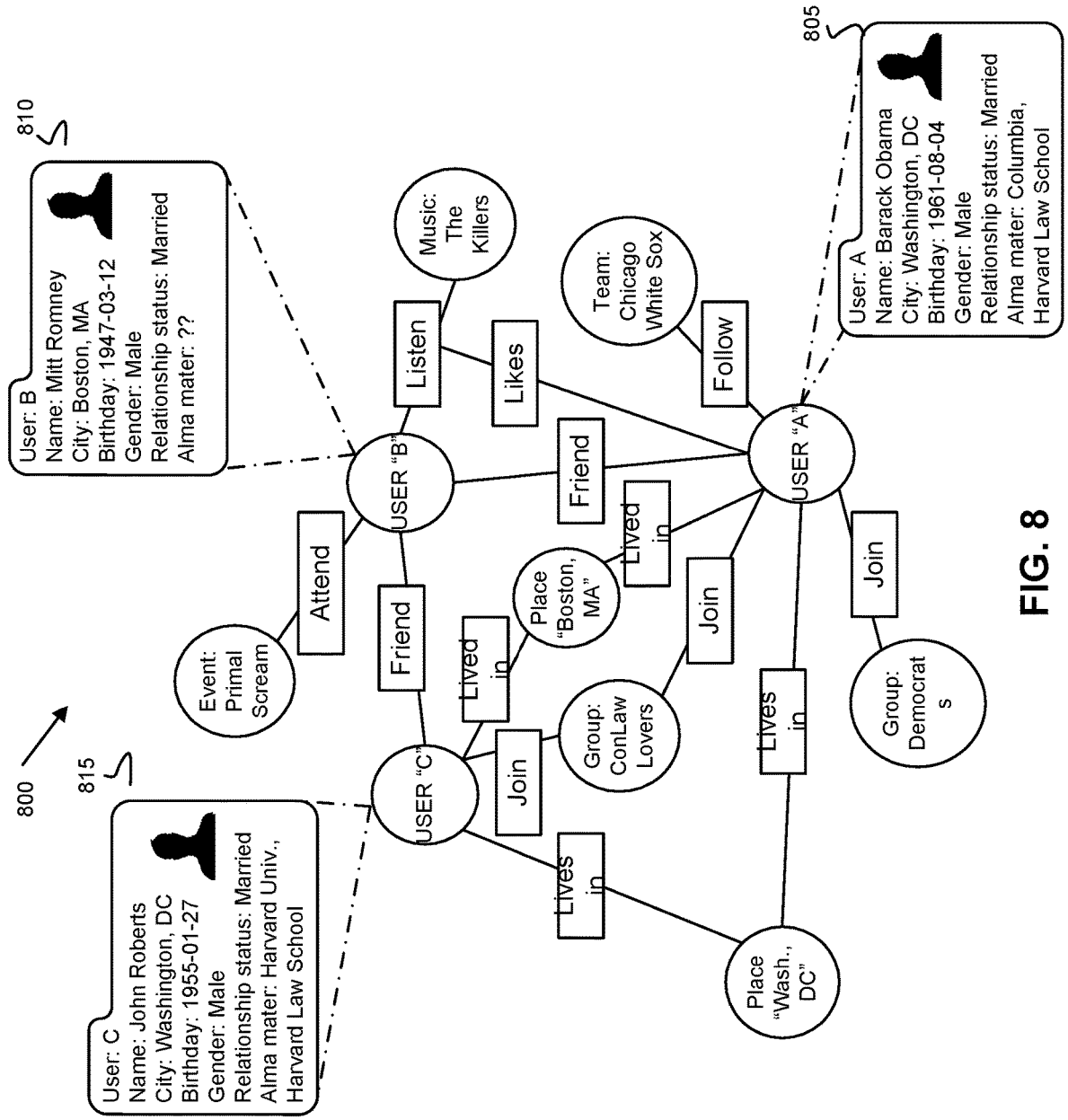
FIG. 8 illustrates an exemplary graph of social network data.

FIG. 8 illustrates exemplary social graph 800 of social network data. A social graph may be used to find social affinity between users sending and receiving users, e.g., for determining a timeout period for message withdrawal. In graph 800, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 800.

In one embodiment, users are able to add demographic information to user profiles 805-815. In one embodiment, for demographic information that has not been entered by a user, a social network application generates an estimate based upon the user's actions, connections, and/or actions of connections. For example, User B has not entered an alma mater into user profile 810. A social network application may determine from User B's contacts, activities, cities of residence, etc. that User B's likely alma mater is one or both of Brigham Young University and Harvard University. In one embodiment, the user profiles 805-810 include additional information, such as relationships to other users, places where the user works/has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and another user/object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity. In one embodiment, users may select privacy settings to control what network service data is shared, with whom the data is shared, and/or what data used for selecting candidate objects.

From the social graph, the social networking system may determine the social affinity of the sending user and the recipient. As described above, the social networking system, the message server, and/or the sending user device may set/adjust the timeout period(s) to a corresponding value based upon the determined social affinity. For example, a table or other data structure may map different levels, values, or types of social affinity to corresponding timeout periods. The system/device setting the timeout period uses the table to look up the timeout period corresponding to the determined social affinity.

Electronic Device Implementing the Embodiments

Figure 9:
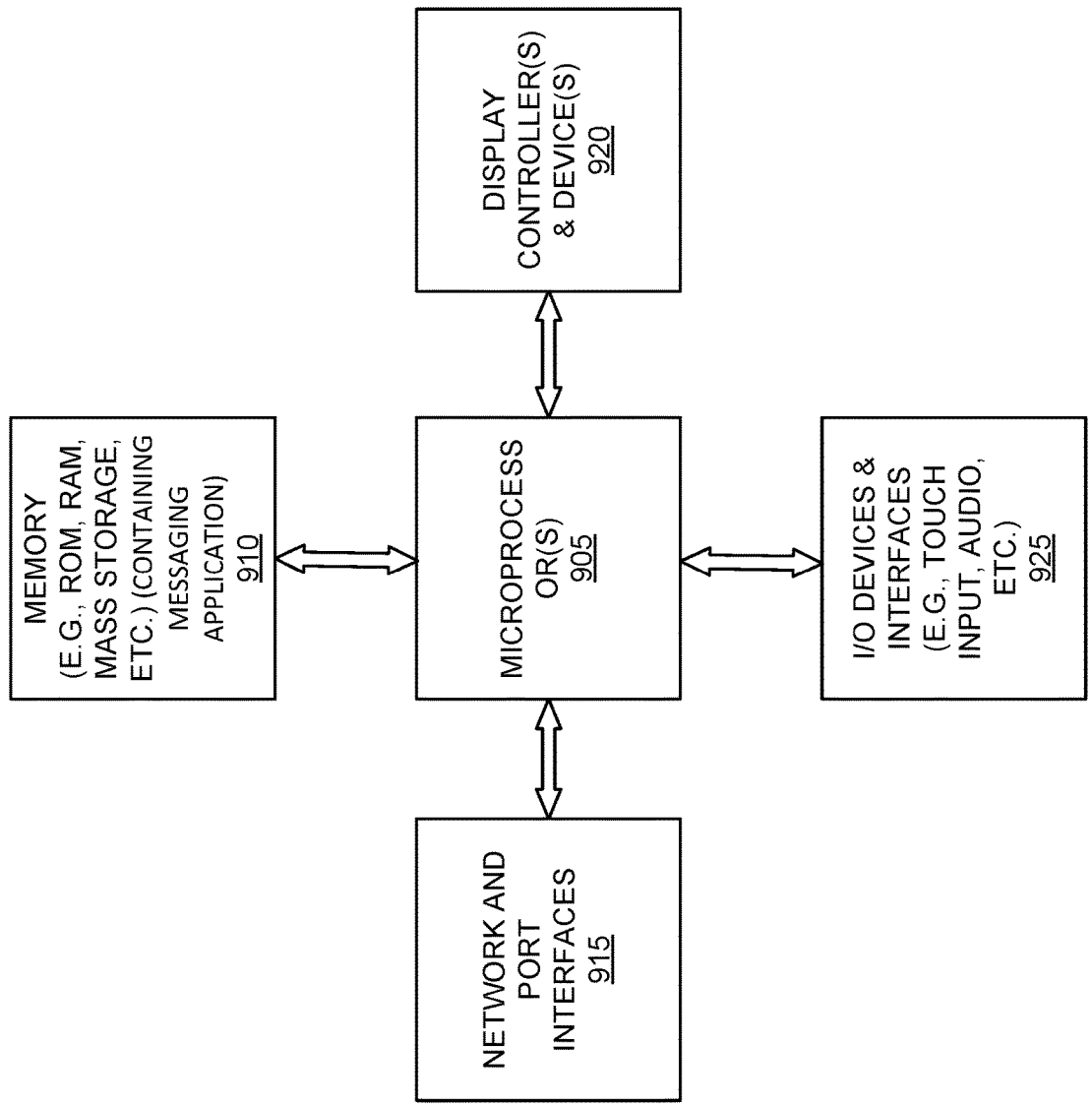
FIG. 9 illustrates, in block diagram form, an exemplary processing system to perform the withdrawal of a message.

FIG. 9 illustrates, in block diagram form, an exemplary processing system 900 to perform withdrawal of a message in a social network. In some embodiments, this is a high-level view of on or more components of social networking system 130 described herein, including message server 124. In another embodiment, system 900 is a high-level view of one of user devices 104A-N or external server 115. Data processing system 900 includes one or more microprocessors 905 and connected system components (e.g., multiple connected chips). Alternatively, data processing system 900 is a system on a chip.

Data processing system 900 includes memory 910, which is coupled to microprocessor(s) 905. Memory 910 may be used for storing data, metadata, and programs for execution by the microprocessor(s) 905. For example, memory 910 may include one or more of the data stores 101 and/or may store modules described herein. Memory 910 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 910 may be internal or distributed memory.

Data processing system 900 includes network and port interfaces 915, such as a port, connector for a dock, or a connector for a USB interface, FireWire, Thunderbolt, Ethernet, Fibre Channel, etc. to connect the system 900 with another device, external component, or a network. Exemplary network and port interfaces 915 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 900 with another device, external component, or a network and receive stored instructions, data, tokens, etc.

Data processing system 900 also includes display controller and display device 920 and one or more input or output ("I/O") devices and interfaces 925. Display controller and display device 920 provides a visual user interface for the user. I/O devices 925 allow a user to provide input to, receive output from, and otherwise transfer data to and from the system. I/O devices 925 may include a mouse, keypad or a keyboard, a touch panel or a multi-touch input panel, camera, optical scanner, audio input/output (e.g., microphone and/or a speaker), an accelerometer, other known I/O devices or a combination of such I/O devices. It will be appreciated that one or more buses, may be used to interconnect the various components shown in FIG. 9.

As used herein, the terms computer, device, system, processing system, processing device, and "apparatus comprising a processing device" may be used interchangeably with data processing system 900 and include the above-listed exemplary embodiments.

Additional components, not shown, may also be part of data processing system 900, and, in certain embodiments, fewer components than that shown in FIG. 9 may also be used in data processing system 900. It will be apparent from this description that aspects of the inventions may be embodied, at least in part, in software. That is, the computer-implemented method(s) of message withdrawal described herein may be carried out in a computer system or other data processing system 900 in response to its processor or processing system 905 executing sequences of instructions contained in a memory, such as memory 910 or other non-transitory machine-readable storage medium. For example, memory 910 may store messaging application 105, external application 150, an application for messenger server 124, etc. The software may further be transmitted or received over a network (not shown) via network interface device 915. In various embodiments, hardwired circuitry may be used in combination with the software instructions to implement the present embodiments. Thus, the techniques are not limited to any specific combination of hardware circuitry and software, or to any particular source for the instructions executed by data processing system 900

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As detailed herein, some embodiments of a method for withdrawal of a message include receiving, by a mobile device, an input to send a first message to a first recipient, the first message containing at least one image or video; processing by the mobile device, the first message for transmittal to the first recipient; detecting within a timeout period, by the mobile device, a first request to withdraw the first message; determining that the first message has not been sent from the mobile device in response to detecting the first request; and terminating, by the mobile device, the processing of the first message for sending in response to the detection of the first request and the determination that the first message has not been sent.

Additionally some embodiments of the method further include one or more of: 1) In some embodiments of the method, the detection within the timeout period comprises at least one of: detecting a level of shaking of the mobile device over a predetermined threshold; detecting a touch or tap of a representation of the recipient on display of the mobile device; and detecting a touch or tap of a send animation for the processing of the message; 2) In some embodiments of the method, the timeout period is adjustable based on at least one of: social affinity between the user and the recipient; a number of users included in the recipient; and frequency of communication between the user and the recipient; 3) In some embodiments of the method, the processing of the first message comprises waiting for the timeout period to expire prior to sending to the first recipient; 4) In some embodiments of the method, the waiting includes placing the first message in a processing queue, and the method further includes processing a second message for sharing by the mobile device to a second recipient, wherein the processing causes sending of the first message from the mobile device prior to the timeout period expiring; 5) In some embodiments of the method, only the first and second recipient being the same recipient causes sending the first message from the mobile device; 5) In some embodiments of the method, the method further includes detecting a second request from the user to withdraw the second message; determining that the second message has been sent from the mobile device; and sending, to a server coupled to the mobile device and an electronic device of the second recipient, a request to withdraw the message upon the determination, the request to withdraw containing a message identifier of the second message; 6) In some embodiments of the method, the request to withdraw, when executed by the server, causes the server to enter the second message into a blacklist, wherein the electronic device of the second recipient is prohibited from retrieving messages within the blacklist; 7) In some embodiments of the method, the request to withdraw, when executed by the server, causes the server to determine whether the second message has been sent from the server toward the electronic device of the second recipient and to transmit a withdrawal request to the electronic device of the second recipient upon the determination that the second message has been sent to the electronic device, and wherein the withdrawal request includes the identifier of the message; 8) In some embodiments of the method, the withdrawal request of the second message may cause the electronic device to perform at least one of the following: deleting the second message in the electronic device; distorting the second message from viewing by the recipient; replacing the second message with a default message; and sending a notification of a result of the withdrawal request toward the mobile device.

As detailed herein, some embodiments of a non-transitory machine-readable medium storing instructions for withdrawal of a message, the instructions include receiving, by a mobile device, a input to send a first message to a first recipient, the first message containing at least one image or video; processing, by the mobile device, the first message for transmittal to the first recipient; detecting within a timeout period, by the mobile device, a first request from the user not to withdraw the first message; determining that the first message has not been sent from the mobile device in response to detecting the first request; and terminating, by the mobile device, the processing of the first message for sending in response to the detection of the first request and the determination that the first message has not been sent.

Additionally some embodiments of the method further include one or more of: 1) In some embodiments of the non-transitory machine-readable medium, the detection within the timeout period comprises at least one of: detecting a level of shaking of the mobile device over a predetermined threshold; detecting a touch or tap of a representation of the recipient on display of the mobile device; and detecting a touch or tap of a send animation for the processing of the message; 2) In some embodiments of the non-transitory machine-readable medium, the timeout period is adjustable based on at least one of: social affinity between the user and the recipient; a number of users included in the recipient; and frequency of communication between the user and the recipient; 3) In some embodiments of the non-transitory machine-readable medium, the processing of the first message comprises waiting for the timeout period to expire prior to sending to the first recipient; 4) In some embodiments of the non-transitory machine-readable medium, the waiting includes placing the first message in a processing queue, and the method further includes processing a second message for sending to a second recipient, wherein the processing causes sending of the first message from the mobile device prior to the timeout period expiring; 5) In some embodiments of the non-transitory machine-readable medium, only the first and second recipient being the same recipient causes sending the first message from the mobile device; 6) In some embodiments of the non-transitory machine-readable medium, the method further includes detecting a second request to withdraw the second message; determining that the second message has been sent from the mobile device; and sending, to a server coupled to the mobile device and an electronic device of the second recipient, a request to withdraw sharing the message with the recipient upon the determination, the request to withdraw containing a message identifier of the second message; 7) In some embodiments of the non-transitory machine-readable medium, the request to withdraw, when executed by the server, causes the server to enter the second message into a blacklist, wherein the electronic device of the second recipient is prohibited from retrieving messages within the blacklist; 8) In some embodiments of the non-transitory machine-readable medium, the request to withdraw, when executed by the server, causes the server to determine whether the second message has been sent from the server toward the electronic device of the second recipient and to transmit a withdrawal request to the electronic device of the second recipient upon the determination that the second message has been sent to the electronic device, and wherein the withdrawal request includes the identifier of the message; 9) In some embodiments, the withdrawal request of the second message causes the electronic device to perform at least one of the following: deleting the second message in the electronic device; distorting the second message from viewing by the recipient; replacing the second message with a default message; and sending a notification of a result of the withdrawal request toward the mobile device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
receiving, from a client device, a first message to send to a first recipient;
processing the first message for transmittal to the first recipient by a messaging server by checking for the first message on a blacklist data structure comprising one or more messages irretrievable by at least the first recipient;
determining, based on the processing, that the first message is initially absent from the blacklist data structure;
detecting receipt of a request to withdraw the first message from the client device within a timeout period;
in response to detecting receipt of the request to withdraw the first message, determining that the first message has not been sent by the messaging server; and
in response to determining that the first message has not be sent by the messaging server:
terminating processing of the first message for transmittal to the first recipient; and
after terminating processing of the first message, entering the first message onto the blacklist data structure to prevent the first recipient from retrieving an unsent version of the first message.

2. The method of claim 1, wherein a duration of the timeout period is based on one or more of:
a frequency with which a user associated with the client device communicates with the first recipient;
a social affinity between the user associated with the client device and the first recipient; and
a number of users included as recipients of the first message in addition to the first recipient.

3. The method of claim 1, wherein the processing of the first message for transmittal comprises waiting for the timeout period to expire before transmitting the first message to the first recipient.

4. The method of claim 1, wherein
the request to withdraw the first message comprises a message identifier,
determining that the first message has not been sent by the messaging server comprises mapping the message identifier to a message being processed for transmittal to the first recipient.

5. The method of claim 1, further comprising:
receiving, from a user device associated with the first recipient, a request to retrieve the first message;
determining that the black-list comprises the first message; and
transmitting a notification to the user device associated with the first recipient that the request to retrieve the first message is denied.

6. The method of claim 1, further comprising:
receiving, from the client device, a second message to send to a second recipient;
processing the second message for transmittal to the second recipient by the messaging server;
detecting receipt of a first request to withdraw the second message;
determining that the second message has been sent to the second recipient by the messaging server; and
based on determining that the second message has been sent, sending a second request to withdraw the second message to a user device associated with the second recipient.

7. The method of claim 6, wherein the second request to withdraw the second message causes the user device associated with the second recipient to perform at least one of the following:
deleting the second message in the user device associated with the second recipient;
distorting the second message from viewing by the second recipient;
replacing the second message with a default message; and
sending, to the client device, a notification of the result of the second request to withdraw the second message.

8. The method of claim 6, wherein
the first request to withdraw the second message comprises a second message identifier,
determining that the second message has been sent to the second recipient by the messaging server comprises mapping the second message identifier to a message that has been transmitted to the second recipient.

9. A non-transitory computer readable storage medium comprising instructions that, when executed by at least one processor, cause a computing device to:
receive, from a client device, a first message to send to a first recipient;
process the first message for transmittal to the first recipient by a messaging server by checking for the first message on a blacklist data structure comprising one or more messages irretrievable by at least the first recipient;
determine, based on the processing, that the first message is initially absent from the blacklist data structure;
detect receipt of a request to withdraw the first message from the client device within a timeout period;
in response to detecting receipt of the request to withdraw the first message, determine that the first message has not been sent by the messaging server; and
in response to determining that the first message has not be sent by the messaging server:
terminate processing of the first message for transmittal to the first recipient; and
after terminating processing of the first message, enter the first message onto the blacklist data structure to prevent the first recipient from retrieving an unsent version of the first message.

10. The non-transitory computer readable storage medium of claim 9, wherein a duration of the timeout period is based on one or more of:
a frequency with which a user associated with the client device communicates with the first recipient;
a social affinity between the user associated with the client device and the first recipient; and
a number of users included as recipients of the first message in addition to the first recipient.

11. The non-transitory computer readable storage medium of claim 9, wherein:
the request to withdraw the first message comprises a message identifier,
the instructions, when executed by the at least one processor, cause the computing device to determine that the first message has not been sent by the messaging server by mapping the message identifier to a message being processed for transmittal to the first recipient.

12. The non-transitory computer readable storage medium of claim 9, further comprising instructions that, when executed by the at least one processor, cause the computing device to:
receive, from the client device, a second message to send to a second recipient;

process the second message for transmittal to the second recipient by the messaging server;
detect receipt of a first request to withdraw the second message;
determine that the second message has been sent to the second recipient by the messaging server; and
based on determining that the second message has been sent, send a second request to withdraw the second message to a user device associated with the second recipient.

13. The non-transitory computer readable storage medium of claim 12, wherein the second request to withdraw the second message causes the user device associated with the second recipient to perform at least one of the following:
   deleting the second message in the user device associated with the second recipient;
   distorting the second message from viewing by the second recipient;
   replacing the second message with a default message; and
   sending, to the client device, a notification of the result of the second request to withdraw the second message.

14. The non-transitory computer readable storage medium of claim 12, wherein
the first request to withdraw the second message comprises a second message identifier,
the instructions, when executed by the at least one processor, cause the computing device to determine that the second message has been sent to the second recipient by the messaging server by mapping the second message identifier to a message that has been transmitted to the second recipient.

15. A system, comprising:
at least one processor; and
a non-transitory computer readable storage medium comprising instructions that, when executed by the at least one processor, cause the system to:
   receive, from a client device, a first message to send to a first recipient;
   process the first message for transmittal to the first recipient by a messaging server by checking for the first message on a blacklist data structure comprising one or more messages irretrievable by at least the first recipient;
   determine, based on the processing, that the first message is initially absent from the blacklist data structure;
   detect receipt of a request to withdraw the first message from the client device within a timeout period;
   in response to detecting receipt of the request to withdraw the first message, determine that the first message has not been sent by the messaging server; and
   in response to determining that the first message has not be sent by the messaging server:
      terminate processing of the first message for transmittal to the first recipient; and
      after terminating processing of the first message, enter the first message onto the blacklist data structure to prevent the first recipient from retrieving an unsent version of the first message.

16. The system of claim 15, wherein:
the request to withdraw the first message comprises a message identifier,
the instructions, when executed by the at least one processor, cause the system to determine that the first message has not been sent by the messaging server by mapping the message identifier to a message being processed for transmittal to the first recipient.

17. The system of claim 15, further comprising instructions that, when executed by the at least one processor, cause the system to:
   receive, from the client device, a second message to send to a second recipient;
   process the second message for transmittal to the second recipient by the messaging server;
   detect receipt of a first request to withdraw the second message;
   determine that the second message has been sent to the second recipient by the messaging server; and
   based on determining that the second message has been sent, send a second request to withdraw the second message to a user device associated with the second recipient.

18. The system of claim 17, wherein the second request to withdraw the second message causes the user device associated with the second recipient to perform at least one of the following:
   deleting the second message in the user device associated with the second recipient;
   distorting the second message from viewing by the second recipient;
   replacing the second message with a default message; and
   sending, to the client device, a notification of the result of the second request to withdraw the second message.

19. The system of claim 17, wherein
the first request to withdraw the second message comprises a second message identifier,
the instructions, when executed by the at least one processor, cause the system to determine that the second message has been sent to the second recipient by the messaging server by mapping the second message identifier to a message that has been transmitted to the second recipient.

20. The system of claim 15, further comprising instructions that, when executed by the at least one processor, cause the system to reject a retrieval request from the first recipient to retrieve the first message after being entered onto the blacklist data structure.

* * * * *